Patented July 14, 1931

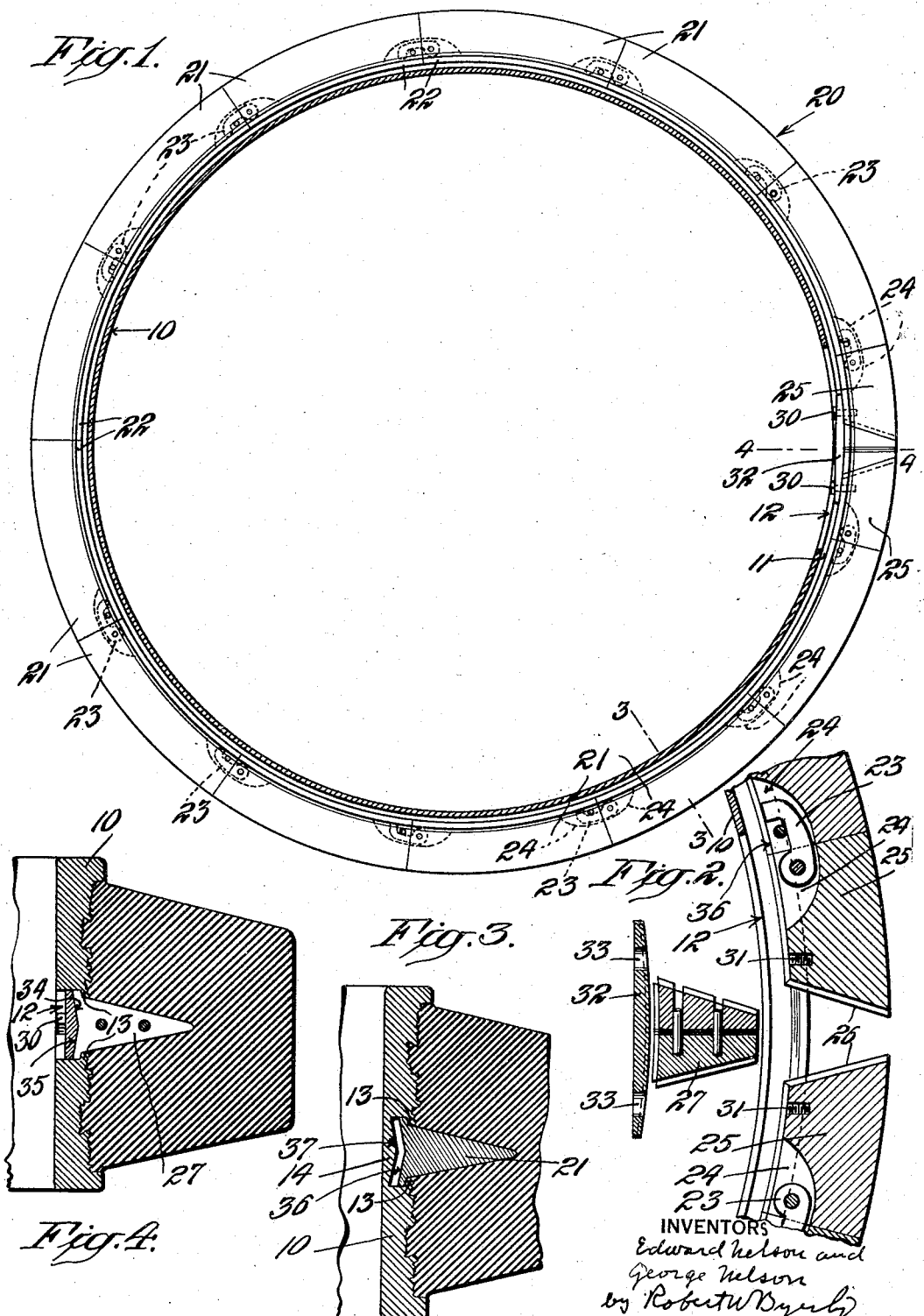

1,814,731

UNITED STATES PATENT OFFICE

EDWARD NELSON AND GEORGE NELSON, OF BELLEVILLE, NEW JERSEY, ASSIGNORS TO OVERMAN CUSHION TIRE COMPANY, INC., OF NEW YORK, N. Y., A CORPORATION OF NEW YORK

APPARATUS FOR MAKING CUSHION TIRES

Application filed April 18, 1930. Serial No. 445,247.

This invention relates to apparatus for making cushion tires, and aims to provide for forming a cushion tire on a strong one-piece base-band in an ordinary tire mold.

In co-pending application Serial No. 194,362, filed May 26, 1927, by Albert L. Schoff and us as joint inventors, there is described an apparatus for making cushion tires, which includes a sectional core having flanges which lie under the ledges of an undercut groove in a tire base. This sectional core is expanded circumferentially by a wedge to force the flanges of the core sections outward against the ledges of the base groove to place the core in position for the molding of the tire against it. After the molding, the core is allowed to contract circumferentially, permitting its sections to drop down in the groove in the base, so that they are free from the rubber which has been molded about them and may be moved along the groove in the base to a slot through which they are withdrawn.

In a specific apparatus shown in that application, the wedge for causing the circumferential expansion of the core was forced into the core by means of a screw threaded into a ring underlying the base of the core and forming part of a special tire mold. In accordance with the present invention, we have improved the core-expanding apparatus by forming it so that it may be located wholly outside the inner circumferential surface of the tire base. This permits the expansion of the core before any part of the tire mold is applied to the base-band of the tire and, therefore, permits placing the expanded core and the base-band in an ordinary tire mold. The invention involves a further improvement in the direction of strengthening the base of the tire as hereinafter described. The exact nature of the invention may best be understood from a detailed description of the specific embodiment of it which is shown in the accompanying drawings, in which:

Fig. 1 is a side view of a base-band and core embodying the invention, the base-band being sectioned on its median plane;

Fig. 2 is an enlarged, partial, median section of the base-band and core, showing the slot in the base-band, and the wedge about to be inserted in the core to expand it circumferentially;

Fig. 3 is an enlarged transverse section on the line 3—3 of Fig. 1; and

Fig. 4 is an enlarged transverse section on the line 4—4 of Fig. 1 showing, in addition to the parts shown in Fig. 1, a tire body molded against the core and base-band.

The base-band 10 is of the type commonly used for vulcanized-on solid tires, differing from such base-bands only in that it contains in its outer periphery a centrally located, undercut circumferential groove 11 and a slot 12 extending from a portion of the bottom of said groove through to the inner surface of the base-band.

The core 20 consists of arcuate sectors 21 having their ends abutting on radial lines. The cross-sectional shape of the sectors corresponds to the cross-section of the desired cavity in the tire. Each sector has at its bottom lateral flanges 22 adapted to underlie the overhanging ledges 13 at the sides of the undercut groove 11. The sectors 21 are loosely linked together by means of hooks 23 lying in grooves 24 formed in the center of each sector at its lower corners. At the point of the core which is diametrically opposite the slot 12, no link is provided. The groove 11 in the base-band has a radial depth below its overhanging ledges 13 greater than the thickness of the flanges 22 of the core sections, so as to permit a radial in- and-out movement of each core section.

Short core sections 25 which are placed directly over the slot 12 in the base-band are provided with inclined end surfaces 26 between which a wedge 27 may be inserted to expand the core circumferentially, so as to draw the flanges 22 of the core sections against the ledges 13 of the groove in the base-band. The wedge 27 is made of two parts separated by shims, so that its length may be adjusted.

In so far as our apparatus has been described, it corresponds with that shown in the prior application heretofore mentioned. The improvements which we have effected over that apparatus will next be described.

The means for forcing the wedge 27 into the core to expand the core circumferentially consists of two screws 30 which may be threaded into tapped holes 31 formed in the bottoms of the short core sections 25, and a bar 32 underlying the wedge 27 and drawn towards the core by the heads of the screws 30. The bar is provided with slots 33 for the screws, so that the screws may move away from one another during the separating movement of the short core sections 25 caused by forcing the wedge 27 in between them. The bar 32 is so thin that, when it is drawn in to expand the core, it and the heads of the screws 30 lie in the slot 12 and completely outside the inner peripheral surface of the base-band 10.

In order to make this possible and at the same time to give the bar 32 the necessary strength, the bottom surfaces of the wedge 27 and the short sections 25 contain a shallow V-shaped groove 34 providing space for a V-shaped ridge 35 on the outer surface of the bar 32 which adds materially to its strength.

All the sections 21 of the core contain in their bottoms a shallow V-shaped groove 36 like the groove 34. This permits forming a wide ridge 37 on the strip of metal 14 of the base-band at the bottom of the groove 11, which adds materially to the strength of the base-band.

The upper surfaces of the flanges 22 of the core sectors and the under surfaces of the ledges 13 of the groove in the base-band are made parallel to the inclined sides of the groove 36 in the bottom surfaces of the core sections. The portions of the sides of the core sections immediately above the flanges are inclined, and the inner edges of the ledges 13 are correspondingly inclined. This results in a wedge fit between the lower ends of the core sections and the sides of the grooves when the core is expanded circumferentially, which effectively excludes rubber compound from the space below the core sectors during the molding of the tire body, without the use of the core covering described in the aforesaid application.

The apparatus which has been described is used in the manner described in the aforesaid application, except that no part of the tire mold need be applied until after the core has been expanded, and the core and base-band, with the material for a tire body placed thereon, may then be placed in any ordinary type of tire mold.

What is claimed is:

1. Apparatus for making a hollow vulcanized-on cushion tire, comprising a metal base-band having an undercut circumferential groove in its outer periphery and a longitudinal slot registering with a part of said groove, an annular core consisting of arcuate core sections having lateral flanges fitting loosely in said groove under the overhanging edges thereof, and means for expanding said core circumferentially located in said slot and lying wholly outside the inner surface of the base-band.

2. Apparatus for making a hollow vulcanized-on cushion tire, comprising a metal base-band having an undercut circumferential groove in its outer periphery and a longitudinal slot registering with a part of said groove, an annular core consisting of arcuate core sections having lateral flanges fitting loosely in said groove under the overhanging edges thereof, said core containing a tapering opening, a wedge insertable into said opening, and means directly engaging the sections of the core at opposite sides of said opening and adapted to force said wedge into the core to expand it circumferentially.

3. Apparatus for making a hollow vulcanized-on cushion tire, comprising a metal base-band having an undercut circumferential groove in its outer periphery and a longitudinal slot registering with a part of said groove, an annular core consisting of arcuate core sections having lateral flanges fitting loosely in said groove under the overhanging edges thereof, said core containing a tapering opening, a wedge insertable into said opening, a bar underlying said wedge, and screws passing through slots in the bar and entering tapped holes in the core at opposite sides of the opening therein to draw said bar in to force the wedge into the core and expand it circumferentially.

4. Apparatus for making a hollow vulcanized-on cushion tire, comprising a metal base-band having an undercut circumferential groove in its outer periphery and a longitudinal slot registering with a part of said groove, an annular core consisting of arcuate core sections having lateral flanges fitting loosely in said groove under the overhanging edges thereof, a wedge insertable into the core through the slot in the base-band, a bar in said slot underlying the wedge, and means for drawing said bar towards the inner surface of the core to force the wedge into the core and expand it circumferentially.

5. Apparatus for making a hollow vulcanized-on cushion tire, comprising a metal base-band having an undercut circumferential groove in its outer periphery and a longitudinal slot registering with a part of said groove, an annular core consisting of arcuate core sections having lateral flanges fitting loosely in said groove under the overhanging edges thereof, the sides of the core sections just above said lateral flanges and the overhanging edges of the groove having correspondingly inclined surfaces, and means for expanding the core circumferentially to cause a wedge fit between said correspondingly inclined surfaces.

6. Apparatus for making a hollow vulcanized-on cushion tire, comprising a metal base-band having in its outer periphery an undercut circumferential groove having a strengthening ridge at its bottom, and an annular core consisting of arcuate core sections, having lateral flanges under the overhanging edges of said groove, and containing in their bottoms grooves fitting the strengthening ridge at the bottom of the groove in the base-band, so that the core sections may drop down in the groove.

In testimony whereof we have hereunto set our hands.

EDWARD NELSON.
GEORGE NELSON.